(12) United States Patent
Lee et al.

(10) Patent No.: US 11,669,106 B2
(45) Date of Patent: Jun. 6, 2023

(54) MOVING ROBOT AND CONTROL METHOD THEREOF

(71) Applicant: LG ELECTRONICS INC., Seoul (KR)

(72) Inventors: Jaemin Lee, Seoul (KR); Jeongwoo Ju, Seoul (KR)

(73) Assignee: LG ELECTRONICS INC., Seoul (KR)

(*) Notice: Subject to any disclaimer, the term of this patent is extended or adjusted under 35 U.S.C. 154(b) by 289 days.

(21) Appl. No.: 17/070,343

(22) Filed: Oct. 14, 2020

(65) Prior Publication Data
US 2022/0009109 A1    Jan. 13, 2022

(30) Foreign Application Priority Data
Jul. 9, 2020    (KR) .................. 10-2020-0084697

(51) Int. Cl.
G05D 1/02    (2020.01)

(52) U.S. Cl.
CPC ........... *G05D 1/028* (2013.01); *G05D 1/0242* (2013.01)

(58) Field of Classification Search
CPC .............. G05D 1/028; G05D 1/0242; G05D 2201/0208; G05D 1/0238; G05D 1/0282; B25J 9/1694; B25J 9/1664
See application file for complete search history.

(56) References Cited

U.S. PATENT DOCUMENTS

| | | | |
|---|---|---|---|
| 5,737,646 A * | 4/1998 | Nakajima | ............... G02B 7/28 355/41 |
| 2005/0125115 A1* | 6/2005 | Hiwatashi | ........... G05D 1/0278 701/25 |

(Continued)

FOREIGN PATENT DOCUMENTS

| CN | 106931938 A | * | 7/2007 |
|---|---|---|---|
| EP | 3355149 A1 | * | 8/2018 |

(Continued)

OTHER PUBLICATIONS

International Search Report dated Mar. 15, 2021 issued in International Application No. PCT/KR2020/013976.

(Continued)

*Primary Examiner* — Adam R Mott
*Assistant Examiner* — Sagar KC
(74) *Attorney, Agent, or Firm* — Ked & Associates, LLP (57) ABSTRACT

Disclosed is a control method of a moving robot configured to drive a work area where a plurality of beacons, the control method comprising a radio direction acquiring step of acquiring radio direction information from the beacons; a first distance tracking step of tracking first distance information between the moving robot and the beacons based on the radio direction information, after the radio direction acquiring step; a second distance tracking step of tracking second distance information between the moving robot and an object existing in the work area via a distance sensor provided in the moving robot; and a first comparison step of comparing the first distance information with the second distance information, wherein location recognition of the moving robot is performed based on the radio direction information, when the first distance is equal to the second distance based on the result of the first comparison step.

15 Claims, 7 Drawing Sheets

(56) References Cited

U.S. PATENT DOCUMENTS

| | | |
|---|---|---|
| 2007/0271011 A1 | 11/2007 | Lee et al. |
| 2012/0089323 A1* | 4/2012 | Smid ............... G01S 13/876 |
| | | 701/408 |
| 2012/0109420 A1* | 5/2012 | Lee ............... G05D 1/0261 |
| | | 701/2 |
| 2012/0221187 A1 | 8/2012 | Jeon |
| 2018/0052466 A1 | 2/2018 | Wu |
| 2018/0332765 A1 | 11/2018 | Doughty et al. |
| 2018/0361585 A1* | 12/2018 | Williams ........... G05D 1/0282 |
| 2019/0049977 A1* | 2/2019 | Dean ............... G05D 1/0225 |
| 2020/0018606 A1* | 1/2020 | Wolcott ........... G01C 21/3602 |
| 2020/0139981 A1* | 5/2020 | Schwindt ......... B60W 50/0205 |
| 2021/0004567 A1* | 1/2021 | Hwangbo ........... G06V 10/145 |

FOREIGN PATENT DOCUMENTS

| | | | |
|---|---|---|---|
| KR | 10-2007-0061218 | 6/2007 | |
| KR | 10-2007-0109748 | 11/2007 | |
| KR | 10-2009-0066726 | 6/2009 | |
| KR | 10-2011-0053767 | 5/2011 | |
| KR | 10-2014-0045848 | 4/2014 | |
| KR | 10-2016-0026991 | 3/2016 | |
| WO | WO-2009107430 A1 * | 9/2009 | ............ G05D 1/024 |

OTHER PUBLICATIONS

Korean Notice of Allowance dated Jan. 5, 2022 issued in KR Application No. 10-2020-0084697 (with English translation).

* cited by examiner

MOVING ROBOT AND CONTROL METHOD THEREOF

CROSS-REFERENCE TO RELATED APPLICATION

This application claims priority under 35 U.S.C. § 119 to Korean Application No. 10-2020-0084697 filed on Jul. 9, 2020, whose entire disclosure is hereby incorporated by reference.

BACKGROUND

1. Field

Embodiments of the present disclosure relate to a moving robot that is configured to drive in a work area and may enhance location tracking accuracy, and a control method thereof.

2. Background

A robot has developed for industrial use and played some part of factory automation. Recently, the fields applying the robot have been expanded such that a robot for medical uses, a space aerial robot, and other robots have developed. Even a home robot that may be used for general home use has been developed. One robot capable of driving on its own among such the robots may be called 'a moving robot'.

Specifically, such a moving robot may perform work while autonomously driving even without a user's manipulation. The location recognition of the moving robot is required to facilitate the autonomous driving of the moving robot. Typically, a current location of the robot may be recognized based on information about the map of the moving robot driving and diverse sensor data.

A cited reference (Korean Open-Laid Patent No. 10-2016-0026991, published on Mar. 9, 2016) discloses a method for determining location of a radio frequency (RF) transmitter under multipath inference. However, it is difficult to determine whether the transceived signal is a Line of Sight (LOS) signal by using only one sensor that is disclosed in the cited reference. In other words, it is difficult to recognize the accurate location recognition of the moving robot based on the LOS signal in the RF-based location recognition and determine whether the transceived signal is a non-line of sight (NLOS) or LOS signal by using the single sensor.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Description will now be given in detail according to exemplary embodiments disclosed herein, with reference to the accompanying drawings. The following description is used to help easily understand the method, device and/or system and it should be understood that the embodiments presented herein are not limited by the description.

Figure 1:
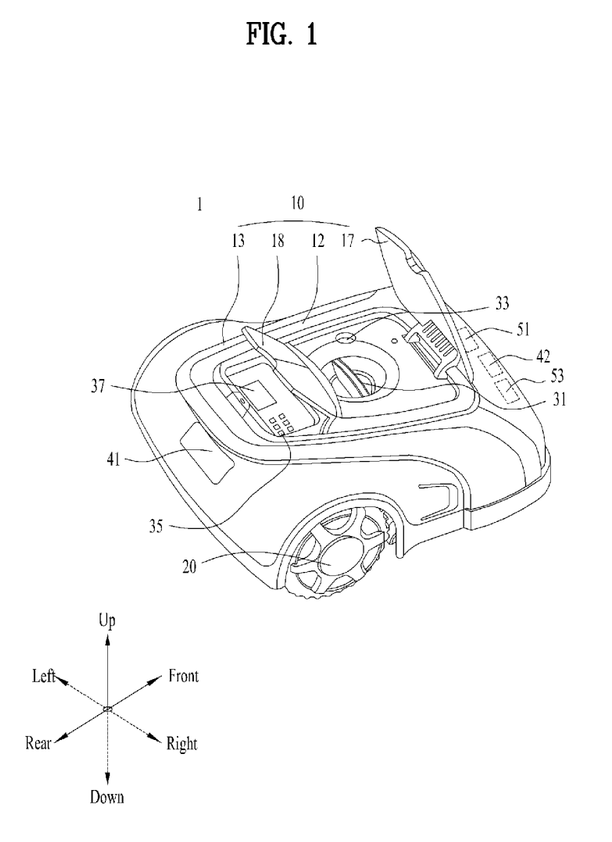
FIG. 1 is a perspective diagram of a moving robot according to one embodiment of the present disclosure.
Figure 2:
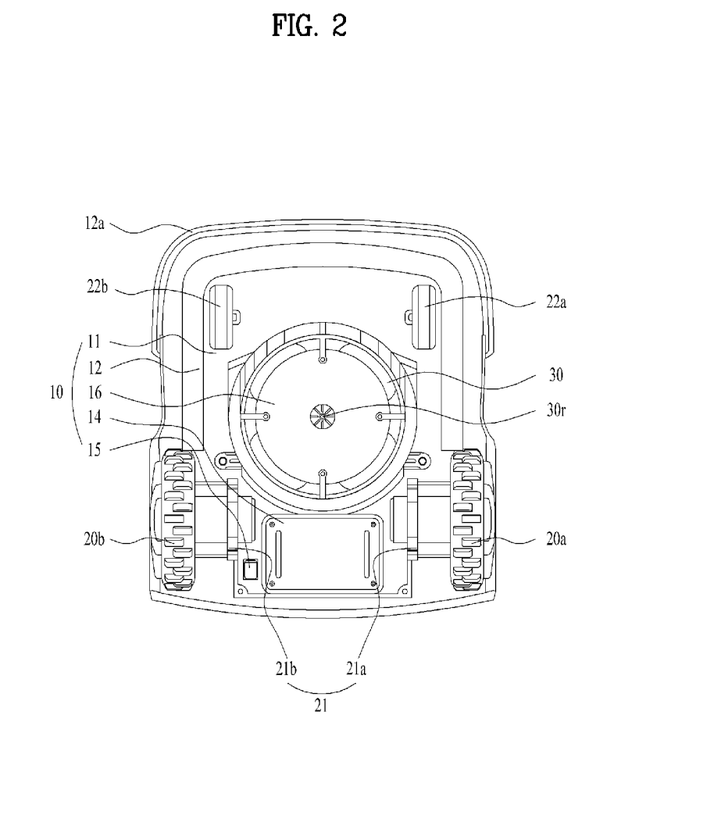
FIG. 2 is a diagram of FIG. 1, viewed from the bottom.

FIG. 1 is a perspective diagram of a moving robot according to one embodiment of the present disclosure and FIG. 2 is a diagram of FIG. 1, viewed from the bottom. Hereinafter, the embodiment will be described, referring to FIGS. 1 and 2.

The moving robot 1 according to the embodiment may include a body 10 that defines the exterior design and the body 10 may define an inner space. The moving robot 1 may include a wheel 20 configured to move the body 10 along a driving surface. The moving robot 1 may include a blade 30 configured to perform a lawn mowing work while the body 10 is moving along a driving surface.

In other words, the moving robot 1 according to the embodiment is described under the premise that it should be a moving robot for mowing lawn. Here, a control method for the location estimation of the moving robot which will be described later may not be necessarily limited to the moving robot for moving lawn.

Meanwhile, the body 10 may include a frame 11 that defines a bottom of the moving robot 1 and fixes a wheel 20, a motor 21 and a blade 30 thereto. A blade motor for providing a torque to the blade 30 may be fixedly mounted to a bottom surface of the frame 11. The frame 11 may provide a frame structure to support other various components.

A caster (not shown) may be arranged in the frame 11 to rotatably support an additional wheel 22. The caster may be rotatable with respect to the frame 11 and rotate on a vertical shaft. The caster may be arranged under the frame 11. A pair of casters may be provided to correspond to a pair of additional wheels 22.

The frame 11 may include a case 12 to cover a top of the body 10 such that it may define an internal space of the moving robot 1. The case 12 may define an upper surface, a front surface, a rear surface and right and left surfaces.

The body 10 may include a case connecting part (not shown) configured to fix the case 12 to the frame 11. The case 12 may be fixed to an upper end of the case connecting part. The case connecting part may be movable along the frame 11. Here, the case connecting part may be movable with respect to the frame 11 only in a vertical direction and it may be movable only in a predetermined distance range. As the case connecting part is integrally moving with the case 12, the case 12 may be also movable with respect to the frame 11.

The body 10 may include a bumper 12a arranged in a front area the bumper 12a installed in the front surface of the moving robot 1 may function to absorb shock if the moving robot 1 collides against or contacts with an obstacle outside during the driving. The bumper 12a may have a front surface and right and left side surfaces that are connected with each other to cover some area of the front and side surface of the body 10. The front surface and the side surfaces may be roundly connected with each other. The bumper 12a may be made of a predetermined material that is available in absorbing shock (e.g., rubber).

The body 10 may include a handle 13. The handle 13 may be arranged in a rear area of the case 12. The handle 13 may be a part that is configured to be held by the user in the hand. Such relatively heavy parts are provided in the rear area of the moving robot 1 as the wheel 20, the motor 21, a battery (not shown). Accordingly, the user may hold the handle 13 arranged in the rear area of the case 12 more stably.

The body 10 may include a battery cover 14 configured to facilitate a battery (not shown) embedded in the moving robot 1 to be moved in or out. The battery cover 14 may be arranged in a lower surface of the frame 11. It may be also arranged in a rear area of the frame 11.

The body 10 may include a power switch 15 for switching on and off the power of the moving robot 1. The power switch 15 may be arranged in the frame 11.

The body 10 may further include a blade cover 16 configured to cover a lower center area of the blade 30. The blade cover 16 may be configured to cover the center of the blade 30 while a centrifugal direction area of the blade is exposed.

The blade 30 may be rotatable on a shaft 30r to mow the lawn by using the centrifugal-direction blade. Accordingly, the moving robot 1 according to the embodiment may prevent a safety accident in which the user using the moving robot 1 might be hurt by the blade 30. In addition, it may prevent the overload of the blade motor (not shown) that might occur because of the lawn foreign substances stuck to the shaft of the blade 30.

The body 10 may include a first cover 17 configured to open and close the area accommodating a height adjusting part 31 and a height displaying 33. The first cover 17 may be hingedly coupled to the case 12 to rotatably perform the opening and closing. The first cover 17 may be provided in an upper surface of the case 12. The first cover 17 may be formed in a plate shape and cover respective tops of the height adjusting part 31 and display 33, in a state of being closed. The first cover 17 may be made of a transparent material to allow the user to check the display 33, in a state of being closed.

The moving robot 1 may adjust the height of the blade 30 with respect to the ground. Accordingly, the moving robot 1 may change the height for mowing the lawn during the driving. The height adjusting part 31 may be configured to facilitate the height change of the blade 30 and provided as a rotary dial. To change the height of the blade 30, the user may open the first cover 17 and rotate the height adjusting part 31 to change the height of the blade 30.

The display 33 may be configured to display a height level of the blade 30. When the height of the blade 30 is changed based on the user's manipulation of the height adjusting part 31, the height level displayed on the height display 33 is correspondingly changed. As one example, the height display 33 may display a height value of lawn that is expected after the moving robot 1 mows lawn, with the blade 30 having the current height.

The body 10 may include a second cover 18 provided to open and close the area accommodating a display module 37 and an input unit 35. The second cover 18 may be hingedly coupled to the case 12 to perform the opening and closing. The second over 18 may be provided in an upper surface of the case 12 and arranged behind the first cover 17. The second cover 18 may be formed in a plate shape and cover the display module 37 and the input unit 35, in a state of being closed. The second cover 18 may be made of a transparent material to allow the user to check the display module 37, in a state of being closed.

An openable angle of the second cover 18 may be set to be smaller than an openable angle of the first cover 17. Then, the user may be allowed to easily open the first cover 17 and manipulate the height adjusting part 31, in a state of the second cover 18 being open. Also, the user may be allowed to easily the contents displayed on the height display 33 with naked eyes, in a state of the second cover being open.

Accordingly, the first cover may be open after a rear end is upwardly lifted with respect to a front end. The second cover 18 may be open after a rear end is upwardly lifted with respect to a front end. The opening of the first and second covers 17 and 18 may be set not to be interfered with each other.

The display module 37 may be arranged in an upper surface of the case 12 and configured to output information towards the user. As one example, the display module 37 may include an LCD (Thin film transistor Liquid Crystal Display) panel. In addition, the display module 37 may be realized by using a plasma display panel, an organic light emitting diode display panel or other various display panels.

The input unit 35 may include a button, a dial and a touch panel. In addition, the input unit 35 may include a microphone (not shown) configured to recognize a voice. The input unit 35 according to the present embodiment may be configured of a plurality of buttons that are arranged in the upper surface of the case 12.

The wheel 20 may include a left wheel 20a provided in a left side of the moving robot 1 and a right wheel 20b provided in a right side of the moving robot 1. Such a pair of wheels may be spaced a preset distance apart from each other to right and left and arranged in a rear lower area of the body 10. The pair of the wheels may be independently rotatable. As one example, when the two wheels are rotating at the same speed, the body 11 may move forward or backward with respect to the ground. When the wheel 20a and the wheel 20b are rotating at different speeds, the body 11 may rotate with respect the ground. In other words, the wheel 20 may be configured to directly affect the driving of the moving robot 1.

The wheel 20 may be provided with the power by the motor 21. The motor 21 may include a motor 21a configured to provide the power to the wheel 20a; and the other motor 21b configured to provide the power to the other wheel 20b, which are spaced a preset distance apart from each other to right and left. The motor 21 may be arranged in a lower rear area of the body 11.

In the present embodiment, the wheel 20a and the other wheel 20 may be directly connected to a shaft of the motor 21a and a shaft of the other motor 21b, respectively. Alternatively, the wheels may have additional elements such as the shaft or provided with the torque of the motors 21a and 21b via a gear or chain.

An additional wheel 22 may be configured to support the body 11 with respect the ground, together with the wheel 20, and arranged in a front lower area of the body 11. The additional wheel 22 of the present embodiment may be arranged in front of the blade 30. The additional wheel 22 may not be provided with the driving power of the motor. The additional wheel may additionally support the body 11 with respect to the ground. The caster for supporting a shaft of the additional wheel 22 may be rotatably coupled to the frame 11 and rotatable with respect to a vertical axis. The additional wheel 22 may include a left additional wheel 22a arranged in a left side and a right additional wheel 22b arranged in the right side.

Figure 3:
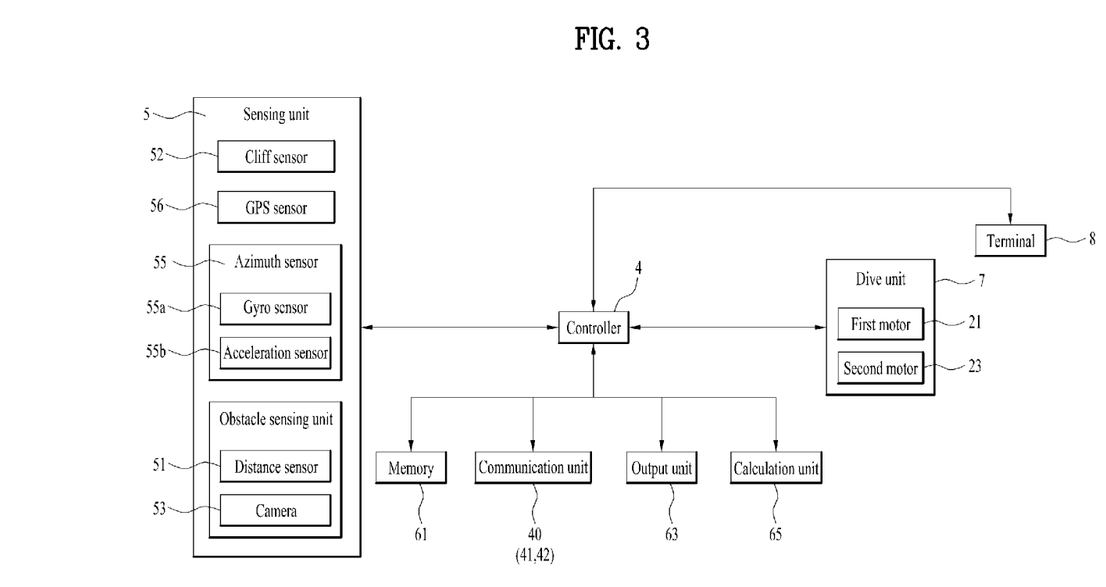
FIG. 3 is a block diagram illustrating a structure of the moving robot according to one embodiment.

FIG. 3 is a block diagram illustrating the structure of the present disclosure according to one embodiment. Hereinafter the structure will be described, referring to FIGS. 1 through 3.

A front sensor 42 may be arranged in a front area of the body 10 and a rear sensor 41 may be arranged in a rear area of the body 10. The front sensor 42 may be arranged in a front area of the moving robot 1 and configured to receive a remote signal that is transmitted from the front and transmit a signal to a rear area of the moving robot.

The rear sensor 41 may be arranged in a rear area of the moving robot 1 and configured to receive the remote signal transmitted from the rear area and transmit the signal to the rear area of the moving robot.

The moving robot 1 may include a communication unit (or communication interface) 40 configured to communicate with an external terminal 8, a server and a router. The communication unit 40 may be realized to facilitate wireless communication between the moving robot 1 and the external terminal 8 and the like via a wireless communication technique (e.g., UWB, Wi-Fi, Bluetooth and etc.). The communication unit 40 may be realized as a different type based on the device it is designed to communicate with or a communication method of the server.

An ultra-Wide Band wireless digital pulse (hereinafter, 'UWB') may be applied to the present embodiment as the wireless short-range communication means. The UWB module has some advantages in terms of the speed, power consumption, distance tracking accuracy and penetration such that it may have advantages as the sensor configured to track a relative distance of the moving robot 1. However, the communication means of the present embodiment may not be limited to the UWB module. Diverse wireless communication techniques may be applicable.

The front sensor 42 may include an obstacle sensor that is arranged in the front area of the moving robot 1 in a main driving direction and configured to sense an obstacle. The obstacle sensor may sense an obstacle that is on a driving direction line of the moving robot 1 or located near the moving robot 1. Examples of such the obstacle sensor may include an infrared ray sensor, an ultrasonic wave sensor, a radio frequency (RF) sensor, a geometric sensor and a PSD (Position Sensitive Device) sensor.

As one example of the obstacle sensor, the present embodiment may include a distance sensor 51 and a camera sensor 53. The distance sensor 51 may be configured to measure a relative distance with an obstacle that is located on a main driving route of the moving robot 1 and recognize present of an obstacle located on the driving route based on the result of the measurement. The camera module 53 may be configured to photograph a video having a predetermined azimuth on the main driving direction route of the moving robot 1 and recognize the presence of the obstacle based on analysis of a controller 4 or a calculation unit 65.

In addition, a cliff sensor 52 may be provided in the front area of the body 10 in the main driving direction of the moving robot 1 and configured to sense a relative distance with the bottom surface. The cliff sensor 52 may sense the height of the moving robot with respect to the driving surface or the amount of the light reflected and incident from the driving surface.

The azimuth sensor 55 may have a Gyro-sensing function. The radio direction sensor 55 may further have an acceleration sensing function. The radio direction sensor 55 may include a Gyro sensor 55a and an acceleration sensor 55b to perform respective functions.

The Gyro sensor 55a may be configured to sense the horizontal rotation speed of the body 10. The Gyro sensor 55a may sense a tilt speed with respect to the horizontal surface of the body. And have a Gyro sensing function for three axes that are orthogonal to each other in a space coordinate system. The information collected by the Gyro sensor 55a may include Roll, Pitch and Yaw. Each of the angular velocities is integrated to calculate a direction angle of the moving robot 1.

The acceleration sensor 55b may have the acceleration sensing function for the three axes that are orthogonal to each other in the space coordinate system. A predetermined processing module may integrate the acceleration to calculate the velocity and the velocity may be integrated to calculate a moving distance.

The azimuth sensor 55 may sense a bottom surface having a big drop, which exists on the driving surface of the moving robot 1, together with the cliff sensor 52.

A GPS sensor 56 may be provided to sense a GPS (Global Positioning System) signal. The GPS sensor 56 may be realized by using a printed circuit board (PCB) loaded in an electric controller installed in the moving robot 1. The location of the moving robot 1 may be found outdoor by the GPS sensor 56.

Rather than the above-noted sensors, other components for the driving control of the moving robot 1 and communication with an external module may be provided in the electric control unit. The electric control unit may be installed in the moving robot 1. The electric control unit may be installed based on the performance of the moving robot 1 or the category of each moving robot brand, before manufactured and released for sales.

The moving robot may drive a work area based on the control of the drive unit controller 6 for the drive unit 7. The drive unit 7 may include a first motor 21 configured to transmit the power to the wheel 20 to facilitate the driving of the moving robot 1 and a second motor 23 configured to transmit the power to the blade 30. The first motor 21 and the second motor 23 may be controlled independently.

As one example, when the moving robot 1 is driving in a work area for mapping, the power supplied by the first motor 21 may be needed but the power supplied by the second motor 23 may not be needed. In other words, when the mapping of the work area or no lawn exists in the work area, only the first motor 21 may be driven during the driving of the moving robot 1.

More specifically, the mapping will be described. The moving robot may not move directly in an initial work area map acquiring step. Instead, a UWB device may be mounted to a roller and map information of the work area may be acquired (hereinafter, 'the roller mapping') or the map information of the work area may be acquired while the user is walking around a border of the work area, with holding an anchor (hereinafter, 'the anchor mapping'). In other words, diverse methods may be used in the map making or acquiring step of the initial work area.

Figure 4:
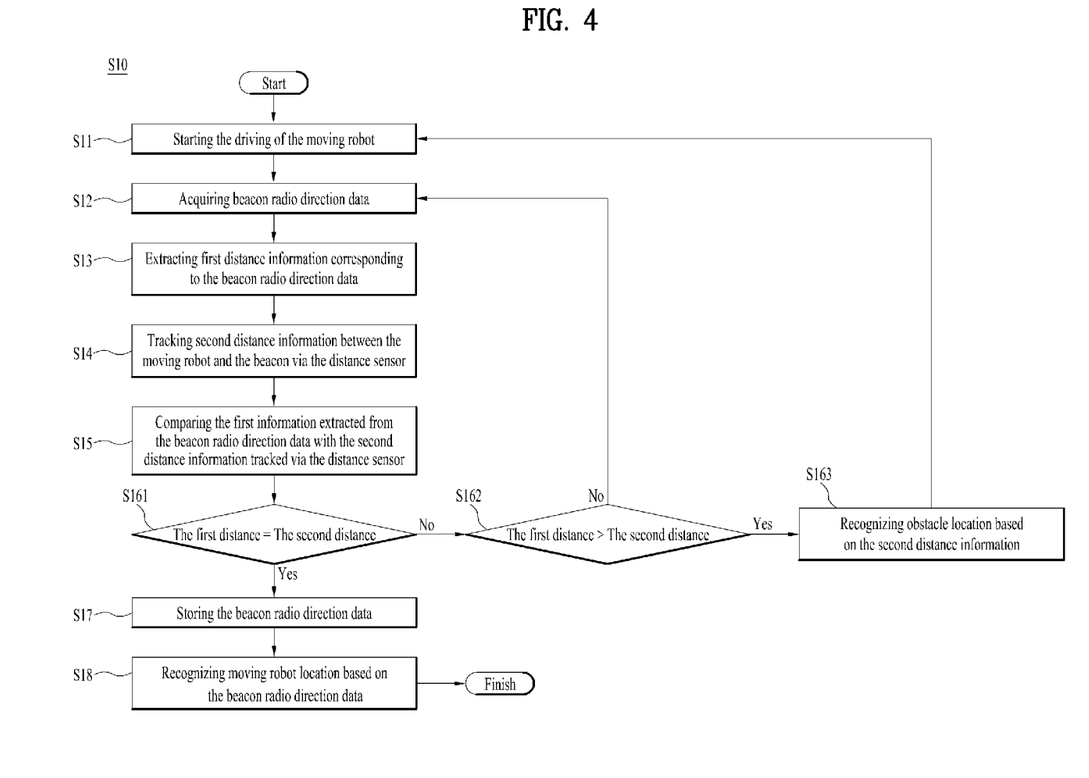
FIG. 4 is a control flow chart according to one embodiment of the present disclosure.
Figure 5:
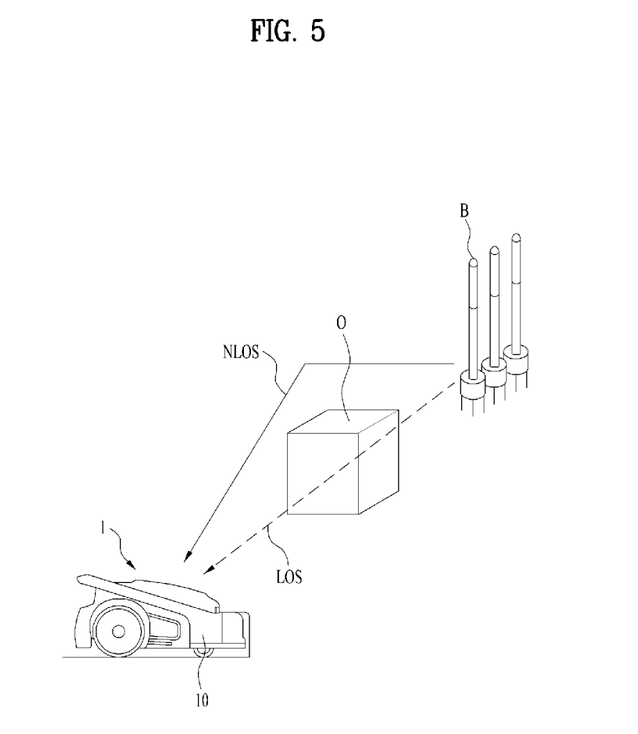
FIG. 5 is a diagram illustrating one example of the control method shown in FIG. 4.

FIG. 4 is a control flow chart of the moving robot according to one embodiment and FIG. 5 is a diagram illustrating one example of the control method shown in FIG. 4. Hereinafter, the embodiment will be described, referring to FIGS. 4 and 5.

In the control method of the moving robot 1 according to this embodiment, a LOS (Line of Sight) signal may be distinguished from a NLOS (Non-Line of Sight) signal in the radio direction information transmitted from the plurality of the beacons installed the work area where the moving robot is driving, so as to enhance the accuracy of the moving robot location tracking. Accordingly, the location of the moving robot 1 may be tracked based on the LOS signal.

The LOS means a straight signal that is transmitted from at least one of the beacons installed in the work area to the moving robot 1. Generally, the LOS signal is a signal having the shortest distance from the beacons to the moving robot 1.

The NLOS signal means a signal that is transmitted not directly to the moving robot 1 but to the moving robot 1 along a farther route than the shortest route by an obstacle or other external factors out of the signals transmitted to the moving robot 1. Accordingly, the NLOS signal may mean the signal that always travel along a farther route than the LOS signal.

The moving robot 1 of the present embodiment may start driving towards a work area or start driving in the work area (S11). As mentioned above, the moving robot 1 may receive the signal from the beacon B installed in the work area and perform the location recognition of the moving robot 1 based on the received signal. Accordingly, the moving robot 1 may be located in the work area before acquiring the radio direction data of the beacon B.

Accordingly, once it starts the driving in the work area, the moving robot 1 may acquire beacon radio direction information S12. Specifically, the radio direction information transmitted from the beacon may be transmitted to the moving robot 1 via the communication unit 40 arranged in the front or rear area of the moving robot 1. The received radio direction information may be stored in a memory 61.

After the radio direction acquiring S12, the first distance tracking step S13 for tracking information about a first distance between the moving robot 1 and the beacon B. The radio direction information transmitted from the beacon B may include information about various directions or ranges from a transmitted reference point. In the present embodiment, the first distance information about the distance between the moving robot and the beacon B may be extracted from the above-noted radio direction information to perform the location recognition of the moving robot 1. The first distance tracking step S13 may be performed by the calculation unit 65 according to the present embodiment.

Hence, a second distance tracking step S14 may be performed to track information about a second distance between moving robot 1 and an object O existing in the work area by using the distance sensor 51 provided in the moving robot 1. The second distance tracking step S14 may be performed after the first distance tracking step S13. Alternatively, the second distance tracking step S14 may be performed before the first distance tracking step S13. When the distance information is acquired via respective different routes before performing the comparison between the acquired information, it may be satisfactory.

Specifically, only when the respective first and second distance information are acquired before a comparison step for comparing the first distance information tracked in the first distance tracking step S13 with the second distance information tracked in the second distance tracking step S14, the performance order of the first distance tracking step S13 and the second distance tracking step S14 may be changed.

It may be preferred that the first distance tracking step S13 and the second distance tracking step S14 are performed at the same time. It may expect a more precise result of the location tracking in tracking the current location of the moving robot 1 to simultaneously perform the two distance tracking steps.

Meanwhile, a first comparison step S161 for comparing the first distance information and the second distance information with each other may be performed after acquiring the first distance information and the second distance information. The first comparison step S161 may compare and determine whether the first distance information is equal to the second distance information.

The when the first distance information is equal to the second distance information based on the result of the first comparison step S161, it may mean that there is no obstacle between the beacon B and the moving robot 1 and that the direction signal transmitted from the beacon B is the LOS signal.

Accordingly, in case the first distance is equal to the second distance based on the result of the first comparison step S161, the direction information of the beacon B may be stored in the memory S17 and the location recognition of the moving robot may be performed based on the direction information of the beacon S18.

When the first distance is different from the second distance based on the result of the first comparison step S161, it may mean that there is an obstacle O between the beacon B and the moving robot 1 or the direction signal transmitted from the beacon B is the NLOS signal because of the obstacle O located between the beacon B and the moving robot 1 or other external factors.

Accordingly, if the first distance is different from the second distance based on the result of the first comparison step S161, the second comparison step S162 for comparing such a difference with a predetermined value may be performed. The second comparison step S162 may be configured to compare relative differences of the first distance and the second distances with each other, while the first comparison step S161 compares them to figure out whether the first and second distances are equal to each other.

When the first distance is larger than the second distance in the second comparison step S162, the first distance information may mean that there an obstacle between the beacon B and the moving robot 1 and that the direction information signal transmitted from the beacon B is the NLOS signal that travels along a farther route than the shortest route between the moving robot 1 and the beacon B because of the obstacle O.

Accordingly, when the first distance is larger than the second distance based on the result of the second comparison step S162, the location recognition may be performed based on the second distance information. The object may be the obstacle O in the present embodiment.

After the location recognition of the obstacle is performed based on the second distance S163, the moving robot may drive away from the obstacle O. The process described above for the location recognition of the moving robot may be performed again.

Meanwhile, when the first distance is smaller than the second distance based on the result of the second comparison step S162, the radio direction acquiring step S12 may be performed and the first distance tracking step S13, the second distance tracking step S14 and the first comparison step S161 may be sequentially performed to perform the location recognition of the moving robot 1.

As one example that the first distance is smaller than the second distance in the second comparison step S162, it may be premised that external factors act to the moving robot while tracking the second distance to the object O via the distance sensor or transceiving the signal via the communication unit only to cause a sudden location change. Specifically, when the first distance is smaller than the second distance, the acquiring of the radio direction information about the beacon B may be re-performed and the above-noted process for the precise location recognition of the moving robot may be then re-performed.

As describing the structure of the present embodiment for the above-noted control flow chart in detail, the moving robot according to this embodiment may include the body 10 that defines the exterior design; the plurality of the wheels 20a and 20b provided in both sides of the body 10 and configured to rotate and move the body 10; the motor 21 configured to provide the torque to the wheels; the communication unit 40 provided in the body and configured to receive the radio direction information from the beacon installed in the work area where the body is moving; the distance sensor 51 provided in the body 10 and configured to track the distance between the body 10 and an object located in the work area; the calculation unit 65 configured to compare a first distance extracted between the body and the beacon based on the direction information with a second distance measured between the body and the object via the distance sensor 51; and the controller 4 electrically connected with the communication unit 40 and the calculation unit 65. The controller 4 may perform the location recognition of the body based on the direction information when the first distance is equal to the second distance.

Figure 6:
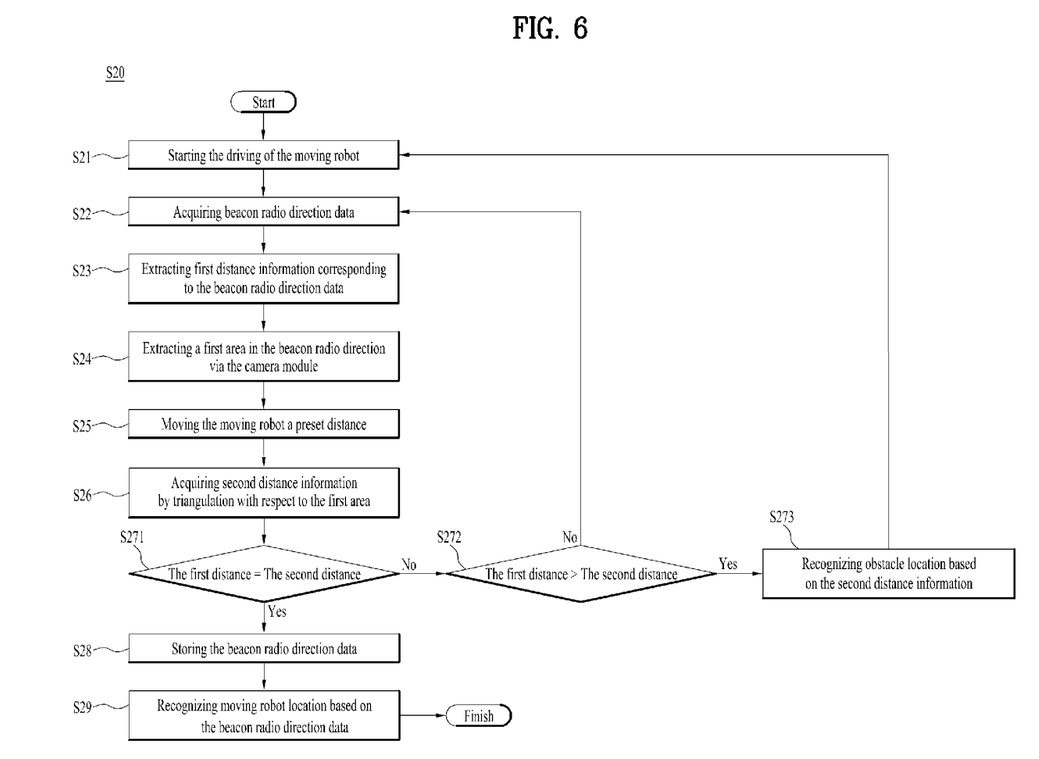
FIG. 6 is a control flow chart according to another embodiment.
Figure 7:
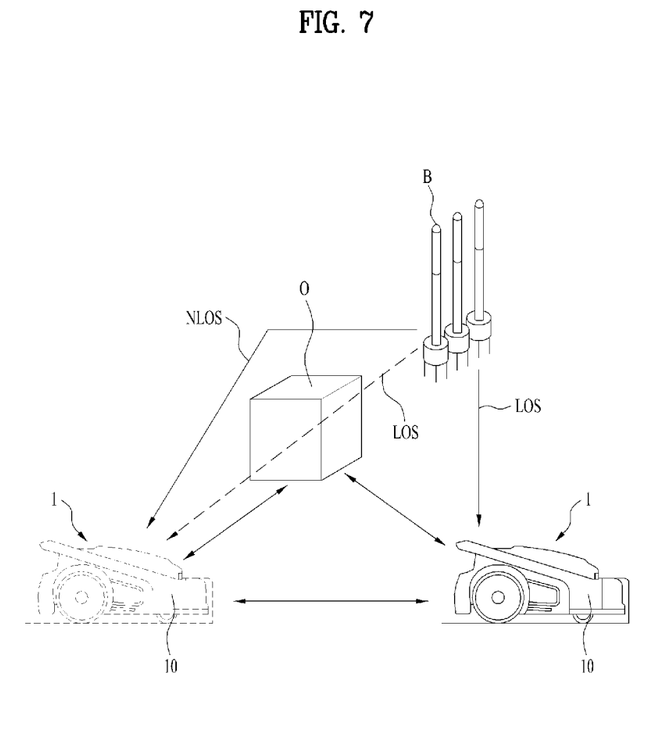
FIG. 7 is a diagram illustrating one example of the control method shown in FIG. 6.

FIG. 6 is a control flow chart according to another embodiment and FIG. 7 is a diagram illustrating one example of the control method shown in FIG. 6. Referring to FIG. 6, the embodiment will be described. Here, repeated description will be omitted, compared with the embodiment shown in FIG. 4.

This embodiment is provided to enhance the location recognition accuracy of the moving robot by comparing the distance information acquired in respective different routes, similar to the embodiment shown in FIG. 4. The control method of the embodiment may include an area setting step S24 for setting a first area in the beacon radio direction via the camera module 53 after extracting the first distance information corresponding to the beacon radio direction.

After the area setting step S24, a second distance tracking step S26 may be performed to tracking the second distance information between moving robot 1 having moved a preset distance in the first area set in the area setting step S24 and the object O existing in the work area by triangulation. In other words, after area of interest is extracted from the video photographed via the camera module 53 in the beacon direction, the moving robot 1 may move by the unit length. The distance between the object O and the moving robot 1 may be measured by the triangulation with respect to the area of the interest in the video via the calculation unit 65. In this embodiment, the distance between the object O and the moving robot 1 may be defined as the second distance.

The first comparison step S271 may be performed to compare with the first distance with the second distance, when the second distance information is acquired in the second distance tracking step S26 and the first distance information is acquired in the first distance tracking step S23. The following description may be equally applied to the embodiment shown in FIG. 4.

Specifically, this embodiment is a control method applying a different method of tracking the second distance, compared with the embodiment shown in FIG. 4. The embodiment shown in FIG. 4 uses the distance sensor 51 to track the second distance. This embodiment uses the camera module 53 to measure the second distance.

As describing the structure of this embodiment to the above-noted control flow chart in detail, the moving robot may include the body 10 defining the exterior design; the plurality of the wheels 20a and 20b provided in both sides of the body 10, respectively, and configured to move the body 10; the motor 21 configured to provide the torque to the wheels; the communication unit 40 provided in the body and configured to receive radio direction information from the beacon installed in the work area where the body 10 moves; and the camera module 53 provided in the body 10 and configured to photograph a video near the body.

The moving robot may further include the calculation unit 65 configured to extract the first distance between the body 10 and the beacon B based on the radio direction information and set a first area in the radio direction of the beacon B in the video photographed via the camera module 53 and compare the first distance with the second distance between the body and the object based on the location change of the body in the first area; and the controller 4 electrically connected with the calculation unit 65 and configured to perform the location recognition of the body 10. The controller may perform the location recognition of the body based on the radio direction information, when the first distance is equal to the second distance.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

Accordingly, an aspect of the present disclosure is to address the above-noted and other problems of the conventional moving robot. Another aspect of the present disclosure is to provide a moving robot including a RF receiver configured to track a distance and a radio direction to calculate a radio direction between the receiver and a RF beacon installed in a robot driving area and extract a distance sensor tracking area based on the result of the calculated radio direction and a tracking error and then to compare the calculated distance between the beacon and the receiver with the result of the distance sensor tracking such that the location accuracy of the moving robot may be enhanced by using some beacon information that is corresponding to the location estimation when the result of the comparison satisfies a predetermined condition.

Specifically, the beacon radio direction may be tracked during the driving of the moving robot and a beacon distance and information about the distance sensor may be compared with respect to the corresponding radio direction and it may be determined based on the result of the comparison whether there is an obstacle. Accordingly, the moving robot may be determined whether to apply the beacon radio direction information to the location estimation. An aspect of the present disclosure is to provide such the moving robot and a control method thereof.

Accordingly, embodiments of the present disclosure may provide a control method of a moving robot configured to drive a work area where a plurality of beacons, the control method comprising a radio direction acquiring step of acquiring radio direction information from the beacons; a first distance tracking step of tracking first distance information between the moving robot and the beacons based on the radio direction information, after the radio direction acquiring step; a second distance tracking step of tracking second distance information between the moving robot and an object existing in the work area via a distance sensor provided in the moving robot; and a first comparison step of comparing the first distance information with the second distance information, wherein location recognition of the moving robot is performed based on the radio direction information, when the first distance is equal to the second distance based on the result of the first comparison step. The second distance tracking step may be performed after the first distance tracking step.

The method of the moving robot may further comprise a second comparison step of comparing a difference between the first distance and the second distance with a predetermined value, when the first distance is different from the second distance based on the result of the first comparison step. Location recognition of the object may be performed based on the second distance information, when the first distance is larger than the second distance based on the result of the second comparison step.

After the location recognition of the object, location recognition of the moving robot may be performed by sequentially performing the radio direction acquiring step, the first distance tracking step, the second distance tracking step and the first comparison step while the moving robot is driving.

When the first distance is smaller than the second distance based on the result of the second comparison step, the radio direction acquiring step may be performed and the location recognition of the moving robot is performed by sequentially performing the first distance tracking step, the second distance tracking step and the first comparison step.

Embodiment of the present disclosure may also provide a method of the moving robot configured to drive a work area where a plurality of beacons are installed, the control method comprising a radio direction acquiring step of acquiring radio direction information from the beacons; a first distance tracking step of tracking first distance information between the moving robot and the beacons based on the radio direction information, after the radio direction acquiring step; an area setting step of setting a first area in the radio direction of the beacons via a camera module provided in the moving robot; a second distance tracking step of tracking second distance information between the moving robot having moved a preset distance in the first area and an object existing in the work area by triangulation, after the area setting step and; a first comparison step of comparing the first distance information with the second distance information, wherein location recognition of the moving robot is performed based on the radio direction information, when the first distance is equal to the second distance based on the result of the first comparison step. The second distance tracking step may be performed after the first distance tracking step.

The control method of the moving robot may further a second comparison step of comparing a difference between the first distance and the second distance with a predetermined value, when the first distance is different from the second distance based on the result of the first comparison step. Location recognition of the object may be performed based on the second distance information, when the first distance is larger than the second distance based on the result of the second comparison step.

After the location recognition of the object, location recognition of the moving robot may be performed by sequentially performing the radio direction acquiring step, the first distance tracking step, the second distance tracking step and the first comparison step while the moving robot is driving.

When the first distance is smaller than the second distance based on the result of the second comparison step, the radio direction acquiring step may be performed and the location recognition of the moving robot is performed by sequentially performing the first distance tracking step, the second distance tracking step and the first comparison step.

Embodiment of the present disclosure may also provide a moving robot comprising a body that defines an exterior design; a plurality of wheels provided in both sides of the body, respectively, and configured to move the body; a motor configured to provide a torque to the plurality of the wheels; a communication unit provided in the body and configured to receive radio direction data from a beacon installed in a work area where the body moves; a distance sensor provided in the body and configured to track a distance between the body and an object existing in the work area; a calculation unit configured to compare a first distance extracted between the body and beacons based on the radio direction data with a second distance tracked between the body and the object via the distance sensor; and a controller configured to perform location recognition of the body based on the radio direction data, when the first distance is equal to the second distance, wherein the controller performs location recognition of the body based on the radio direction data, when the first distance is equal to the second distance.

The controller may recognize the object as the beacon, when the first distance is equal to the second distance. The controller may recognize the object as an obstacle, when the first distance is larger than the second distance.

Embodiments of the present may also provide a moving robot comprising a body that defines an exterior design; a plurality of wheels provided in both sides of the body, respectively, and configured to move the body; a motor configured to provide a torque to the plurality of the wheels; a communication unit provided in the body and configured to receive radio direction data from a beacon installed in a work area where the body moves; a camera module provided in the body and configured to photograph a video near the body; a calculation unit configured to set a first area in the beacon radio direction in the video photographed via the camera module and comparing a first distance extracted between the body and the beacon based on the radio direction data and a second distance tracked between the body and the object based on location change of the body in the first area; and a controller configured to perform location recognition of the body based on the radio direction data, when the first distance is equal to the second distance, wherein the controller performs location recognition of the body based on the radio direction data, when the first distance is equal to the second distance.

In certain implementations, a method of controlling a moving robot configured to drive in an area may comprise: acquiring a radio signal from a beacon; determining a first distance between the moving robot and the beacon based on the radio signal; determining a second distance between the moving robot and an object in the area; and comparing the first distance and the second distance, wherein location recognition of the moving robot is performed based on the radio signal when the first distance corresponds to the second distance.

The second distance between the moving robot and the object may be determined by a distance sensor provided in the moving robot. The distance sensor includes at least one of an infrared ray sensor, an ultrasonic wave sensor, a radio frequency (RF) sensor, a geometric sensor, or a Position Sensitive Device (PSD) sensor.

The second distance may be determined after determining the first distance. The method may further comprise: comparing a difference between the first distance and the second distance to a particular value when the first distance is different from the second distance.

Location recognition of the moving robot with respect to the object may be performed based on the second distance when the first distance is greater than the second distance. After location recognition of the moving robot based on the second distance, location recognition of the moving robot is reperformed by sequentially receiving the radio signal from the beacon, determining the first distance between the moving robot and the beacon based on the radio signal, redetermining the second distance between the moving robot and the object, and comparing the first distance and the second distance while the moving robot is driving away from the object.

When the first distance is less than the second distance, the radio signal may be reacquired and location recognition of the moving robot is performed by sequentially performing determining the first distance between the moving robot and the beacon based on the reacquired radio signal, determining the second distance between the moving robot and the object, and comparing the first distance and the second distance.

The second distance between the moving robot and the object may be determined based on images captured by a camera provided in the moving robot. Determining the second distance between the moving robot and the object includes: setting a region in a direction that the radio signal is received from the beacon; capturing at least one of the images after the moving robot has moved a particular distance in the set region; and determining the distance between the moving robot and the object by triangulation.

In another example, a moving robot comprises: a body that defines an exterior appearance; at least one wheel configured to move the body; a motor configured to provide torque to the wheel; a communication interface configured to receive a radio signal from a beacon; a sensor configured to collect data regarding an object in an area where the body is moving; and a controller configured to: determine a first distance between the body and beacon based on the radio signal, determine a second distance between the body and the object based on the data collected by the sensor, compare the first distance and the second distance, and perform location recognition of the body based on the radio signal when the first distance corresponds to the second distance.

The sensor may be a distance sensor configured to detect the second distance between the body and the object. The distance sensor may include at least one of an infrared ray sensor, an ultrasonic wave sensor, a radio frequency (RF) sensor, a geometric sensor, or a Position Sensitive Device (PSD) sensor.

The controller may recognize the object as the beacon when the first distance corresponds to the second distance. The controller may determine that the object as an obstacle and not the beacon when the first distance is larger than the second distance.

The sensor may include a camera configured to capture at least one image of the area, and wherein the controller is further configured to determine the second distance between the body and the object based on the at least one image of the captured by the camera, and the controller is further configured to set a region in a direction of beacon, and manage at least one of the motor or the wheel so that the body moves in the region, and the camera captures the at least one image while the body is moving in the region. The controller is further configured to determine the second distance between the body and the object based on a location change of the body in the region that is determined based on the at least one image.

When the first distance is greater than the second distance, the controller is further configured to: control at least one of the wheel or the motor so that the body moves away from the object, receive another radio signal from the beacon after the moving robot has moved away from the object, redetermine the first distance between the body and the beacon based on the other radio signal, redetermine the second distance between the body and the object after the body has moved away from the object, compare the redetermined first distance and the redetermined second distance, and perform location recognition of the body with respect to the beacon when the redetermined first distance is equal to or less than the redetermined second distance.

When the first distance is less than the second distance, the controller is further configured to: manage the communication interface to reacquire the radio signal after the robot has moved by a set distance, redetermine the first distance between the body and the beacon based on the reacquired radio signal, redetermine the second distance between the body and the object after reacquiring the radio signal, compare the redetermined first distance and the second distance, and perform location recognition of the body with respect to the beacon when the redetermined first distance corresponds to the redetermined second distance.

In another example, a method of controlling a robot configured to move in an area comprises: acquiring a radio signal from a beacon at a first location; determining a first distance between the first location and the beacon based on the radio signal; determining a second distance between the first location and an object in the area; comparing the first distance and the second distance; controlling the robot to move to a second location when the first distance does not correspond to the second distance; and reacquiring the radio signal from the beacon at a second location. The method may further comprise performing location recognition of the robot based on the radio signal when the first distance corresponds to the second distance; and performing location recognition of the robot based on the reacquired radio signal when the first distance does not correspond to the second distance.

Accordingly, the embodiments have following characteristics. According to at least one embodiment of the present disclosure, the moving robot may enhance the location recognition accuracy of the moving robot driving the working area, with the plurality of the beacons installed therein. In addition, the moving robot may distinguish the LOS (Ling of Sight) signal and the NLOS (Non-Line of Sight) signal from the other signals transceived for the location estimation of the moving robot driving in the working area and the LOS signal may be used in the location estimation of the moving robot. Accordingly, the moving robot may enhance the location recognition accuracy.

Further scope of applicability of the present invention will become apparent from the detailed description. However, it should be understood that the detailed description and specific examples, while indicating preferred embodiments of the invention, are given by illustration only, since various changes and modifications within the spirit and scope of the invention will become apparent to those skilled in the art from this detailed description.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a robot configured to move in an area, the method comprising:
   acquiring a radio signal from a beacon;
   determining a first distance between the robot and the beacon based on the radio signal;
   determining a second distance between the robot and an object in the area; and
   comparing the first distance and the second distance,
   wherein location recognition of the robot is performed based on the radio signal when the first distance equals the second distance,
   wherein location recognition of the robot with respect to the object is performed based on the second distance when the first distance is greater than the second distance, and
   wherein the second distance determined after determining the first distance.

2. The method of claim 1, wherein the second distance between the robot and the object is determined by at least one of a distance sensor, an infrared ray sensor, an ultrasonic wave sensor, a radio frequency (RF) sensor, a geometric sensor, or a Position Sensitive Device (PSD) sensor.

3. The method of claim 1, wherein after location recognition of the robot is performed based on the second distance, location recognition of the robot is reperformed by while the robot is driving away from the object, receiving another radio signal from the beacon, redetermining the first distance between the robot and the beacon based on the other radio signal, redetermining the second distance between the robot and the object, and comparing the redetermined first distance and the redetermined second distance, and
   wherein location recognition of the robot is performed based on the other radio signal when the redetermined first distance equals the redetermined second distance.

4. The method of claim 1, wherein when the first distance is less than the second distance, the radio signal is reacquired and location recognition of the robot is performed by redetermining the first distance between the robot and the beacon based on the reacquired radio signal, redetermining the second distance between the robot and the object, and comparing the redetermined first distance and the redetermined second distance.

5. The method of claim 1, wherein the second distance between the robot and the object is determined based on images captured by a camera provided in the robot.

6. The method of claim 5, wherein determining the second distance between the robot and the object includes:
   setting a region in a direction that the radio signal is received from the beacon;

capturing at least one of the images after the robot has moved a particular distance in the set region; and
determining the distance between the robot and the object by triangulation of the object in the images.

7. A moving robot comprising:
a body;
at least one wheel configured to move the body;
a motor configured to provide torque to the wheel;
a communication interface configured to receive a radio signal from a beacon;
a sensor configured to collect data regarding an object in an area where the body is moving; and
a controller configured to:
  determine a first distance between the body and the beacon based on the radio signal,
  determine a second distance between the body and the object based on the data collected by the sensor,
  compare the first distance and the second distance, and
  perform location recognition of the body based on the radio signal when the first distance equals the second distance,
  wherein the controller performs location recognition of the robot with respect to the object based on the second distance when the first distance is greater than the second distance, and
  wherein the controller determines the second distance after determining the first distance.

8. The moving robot of claim 7, wherein the sensor includes at least one of a distance sensor, an infrared ray sensor, an ultrasonic wave sensor, a radio frequency (RF) sensor, a geometric sensor, or a Position Sensitive Device (PSD) sensor.

9. The moving robot of claim 7, wherein the controller recognizes the object as the beacon when the first distance equals the second distance.

10. The moving robot of claim 7, wherein the controller determines that the object as an obstacle and not the beacon when the first distance is larger than the second distance.

11. The moving robot moving robot of claim 7, wherein the sensor includes a camera configured to capture at least one image of the area, and
  wherein the controller is further configured to determine the second distance between the body and the object based on the at least one image captured by the camera.

12. The moving robot of claim 11, wherein the controller is further configured to set a region in a direction of the beacon, and manage at least one of the motor or the wheel so that the body moves in the region, and the camera captures the at least one image while the body is moving in the region.

13. The moving robot of claim 12, wherein the controller is further configured to determine the second distance between the body and the object based on a location change of the body in the region that is determined based on the at least one image.

14. The moving robot of claim 7, wherein, when the first distance is greater than the second distance, the controller is further configured to:
  control at least one of the wheel or the motor so that the body moves away from the object,
  receive another radio signal from the beacon after the moving robot has moved away from the object,
  redetermine the first distance between the body and the beacon based on the other radio signal,
  redetermine the second distance between the body and the object after the body has moved away from the object,
  compare the redetermined first distance and the redetermined second distance, and
  perform location recognition of the body with respect to the beacon when the redetermined first distance equals the redetermined second distance.

15. The moving robot of claim 7, wherein, when the first distance is less than the second distance, the controller is further configured to:
  manage the communication interface to reacquire the radio signal after the robot has moved by a set distance,
  redetermine the first distance between the body and the beacon based on the reacquired radio signal,
  redetermine the second distance between the body and the object in connection with reacquiring the radio signal,
  compare the redetermined first distance and the redetermined second distance, and
  perform location recognition of the body with respect to the beacon when the redetermined first distance equals the redetermined second distance.

* * * * *